United States Patent

[11] 3,623,531

[72] Inventors Christopher E. Christie
Akron, Ohio;
William J. Head, Rollingen, Luxembourg
[21] Appl. No. 56,564
[22] Filed July 20, 1970
[45] Patented Nov. 30, 1971
[73] Assignee The Goodyear Tire & Rubber Company
Akron, Ohio

[54] TREAD PATTERN DUPLICATING MACHINE
14 Claims, 7 Drawing Figs.

[52] U.S. Cl. .................................................... 157/13
[51] Int. Cl. .................................................. B29h 17/40
[50] Field of Search ........................................ 157/13

[56] References Cited
UNITED STATES PATENTS
1,521,238  12/1924  Gammeter ..................... 157/13
2,939,520  6/1960  Frohlich et al. ................. 157/13
3,354,929  11/1967  French ........................... 157/13
3,502,131  3/1970  Rawls ............................. 157/13

Primary Examiner—Granville Y. Custer, Jr.
Attorneys—F. W. Brunner and Harlan E. Hummer ABSTRACT: A machine for cutting a tread design, or a series of configured grooves in a molded blank tread of a tire. A precast or molded pattern with a predetermined tread design, and a tire with a blank tread are mounted on the machine for unitary rotation in parallel planes. The machine has a sensor and cutter which are mounted in corresponding spaced relation from the pattern and tire, respectively. The cutter moves in cutting relation with the blank tread in corresponding relation to movement of the sensor over the pattern, such that the tread design on the molded pattern is duplicated on the tread of the tire.

INVENTORS
CHRISTOPHER E. CHRISTIE
WILLIAM J. HEAD

ATTORNEY

INVENTORS
CHRISTOPHER E. CHRISTIE
WILLIAM J. HEAD

ATTORNEY

TREAD PATTERN DUPLICATING MACHINE

BACKGROUND OF THE INVENTION

The invention is particularly well suited for cutting experimental tread designs in tires, especially large tractor and earthmoving tires. Generally, special molds must be designed and built for every new experimental tread design. These molds are costly, especially since they may only be used once. Moreover, it usually takes anywhere from 6 months to a year to obtain a special mold for building such tires. This is very time consuming and oftentimes experimental projects are unduly delayed and even abandoned, because a mold is not readily available for producing the desired tire.

The invention is directed to providing a machine wherein a new tread design can be easily duplicated on tires whose tread has been molded in blank, i.e., the molds are smooth and not provided with grooves and serrations for forming any particular tread pattern. Such a machine is highly beneficial from a molding standpoint since a single mold can be used for producing a number of tires with different tread designs.

Briefly stated, the invention is in a machine for cutting a predetermined tread design in a tire. Means are provided for mounting a rubber tire with a blank tread and a molded segment or pattern of a tire with a predetermined tread design, for unitary rotation through a predetermined arc. A sensor is mounted adjacent the tire pattern for contact gliding relation over the predetermined tread design formed in the pattern. A cutter is mounted adjacent the rubber tire for engaging and cutting a design in the blank tread similar to that of the pattern. Means are provided for moving the cutter in cutting relation with the blank tread of the tire in corresponding relation to contacting movement of the sensor over the predetermined tread design of the pattern.

DESCRIPTION OF THE DRAWING

The following description of the invention will be better understood by having reference to the annexed drawing, wherein:

FIG. 7 is a schematic drawing of the mechanism for monitoring and coordinating movement of the sensor and cutter head of the machine.

DESCRIPTION OF THE INVENTION

Figure 1:
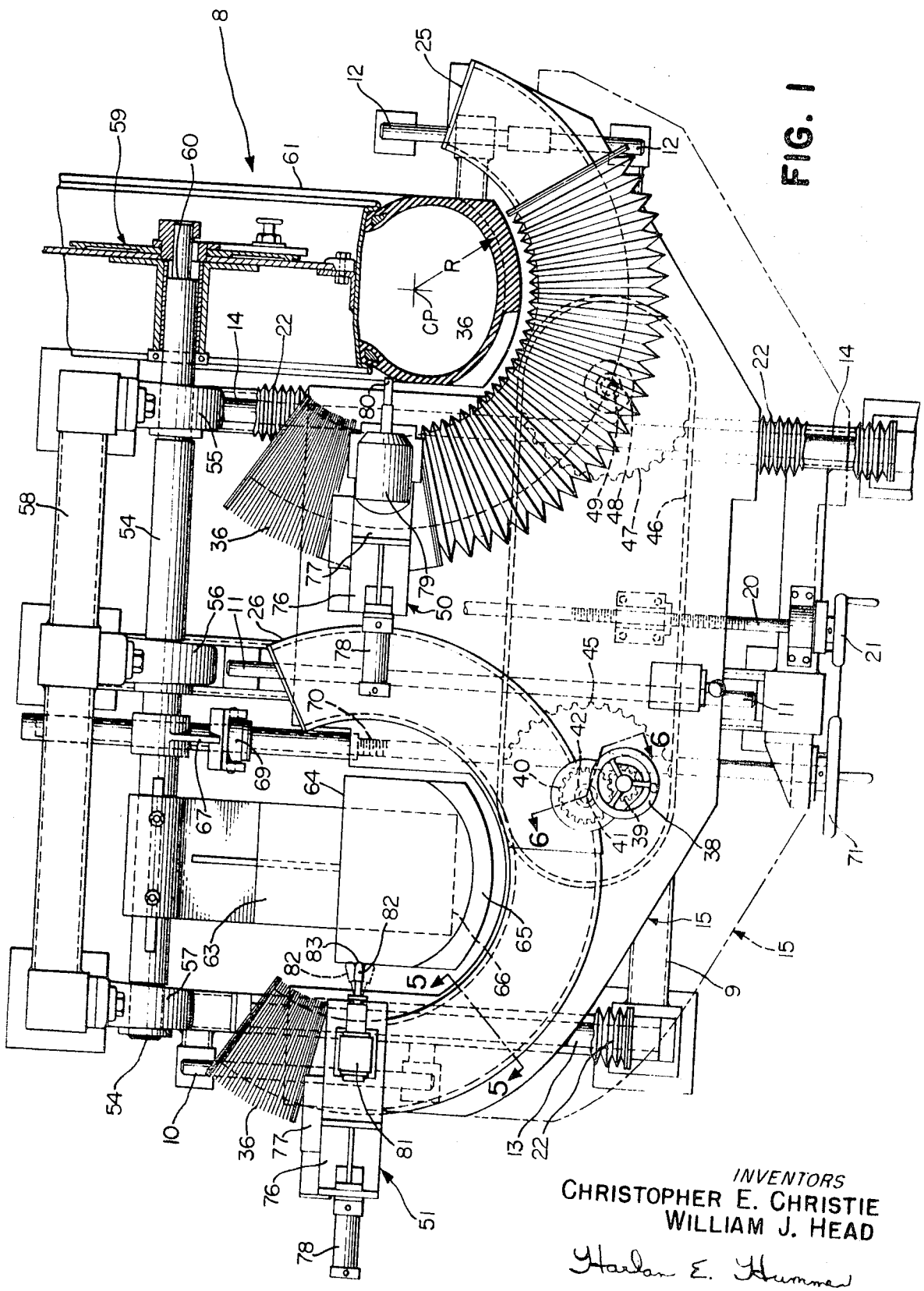
FIG. 1 is a plan view of a machine made in accordance with the invention.
Figure 2:
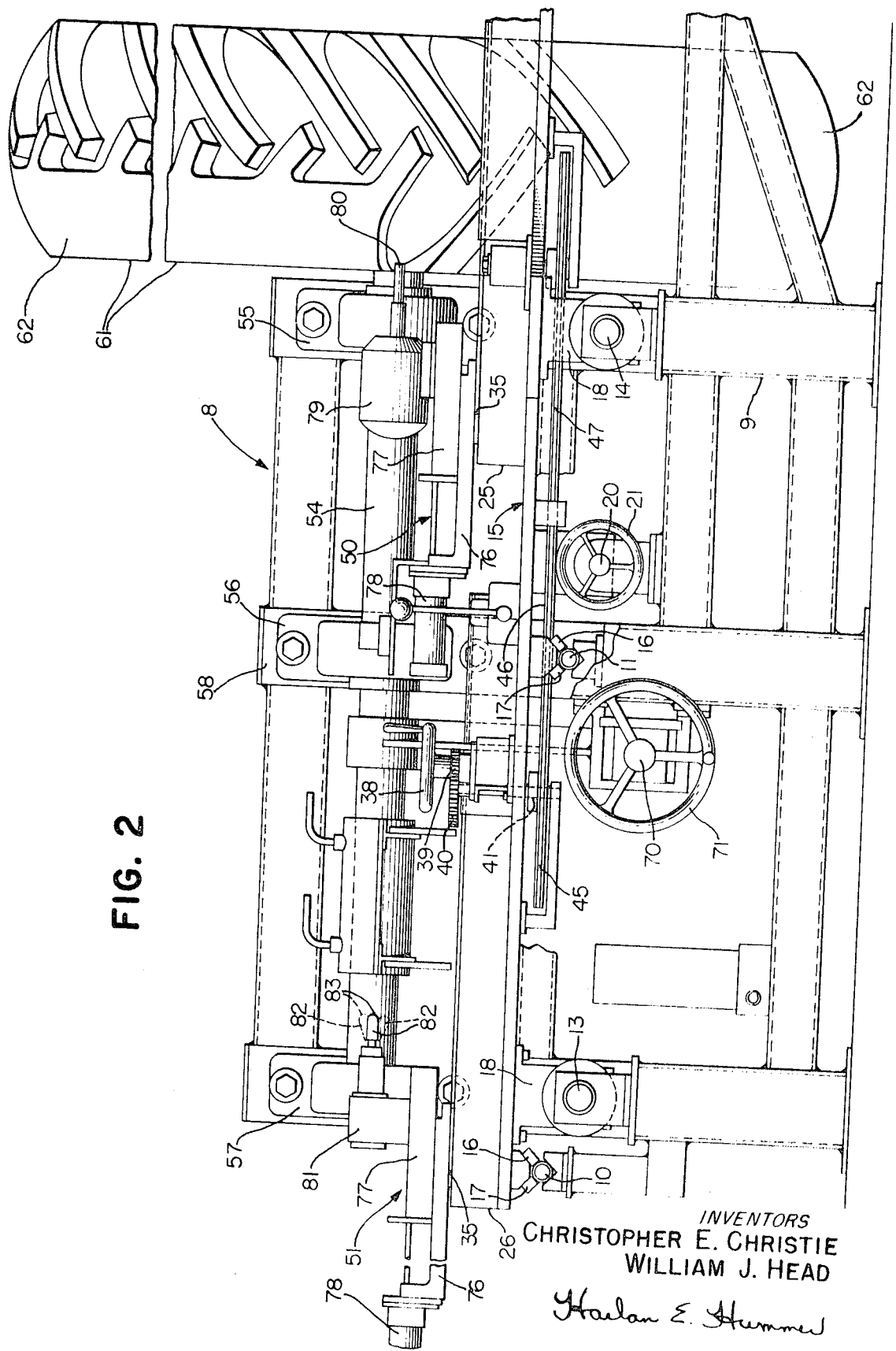
FIG. 2 is a front view of the machine.
Figure 3:
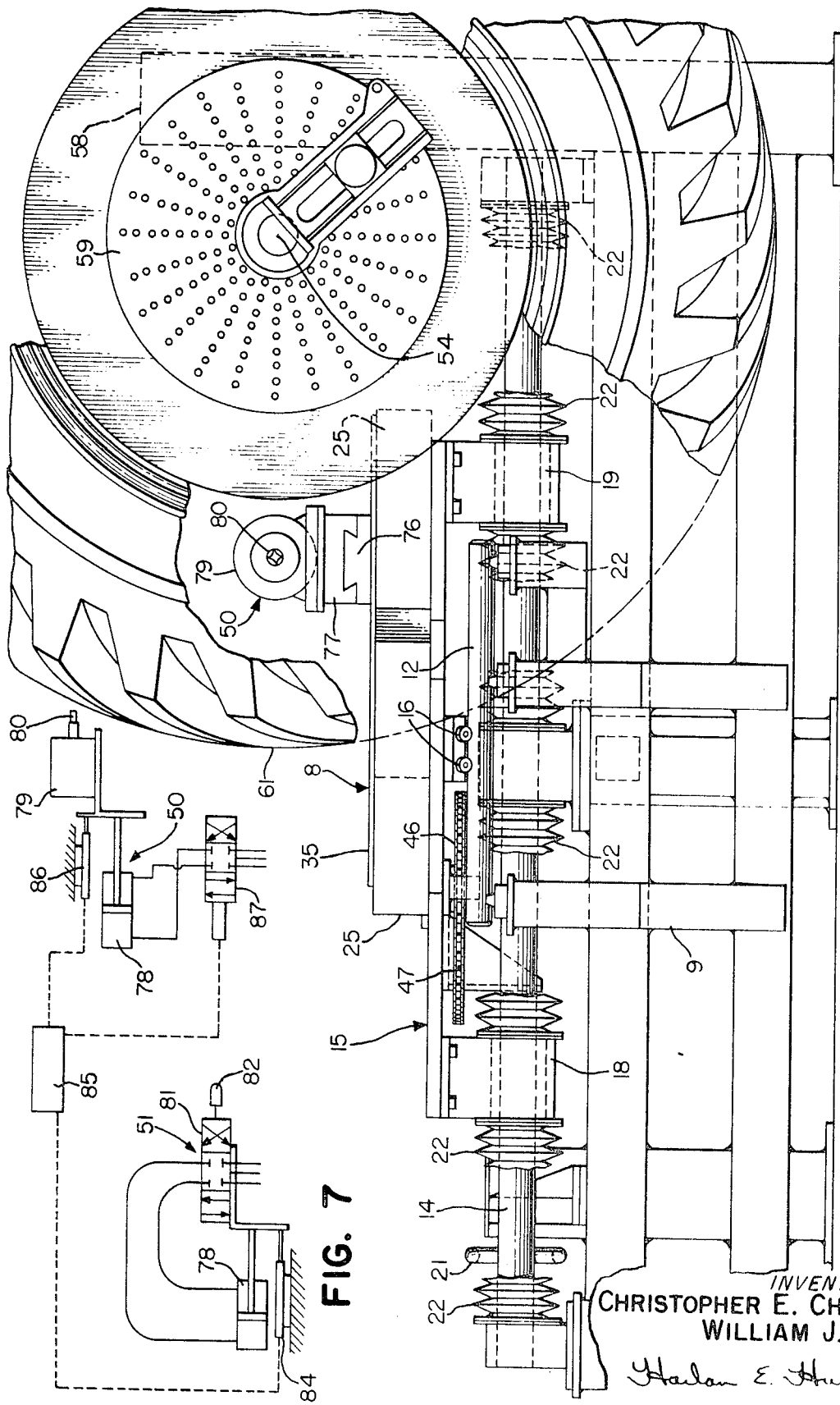
FIG. 3 is a right side view of the machine.
Figure 4:
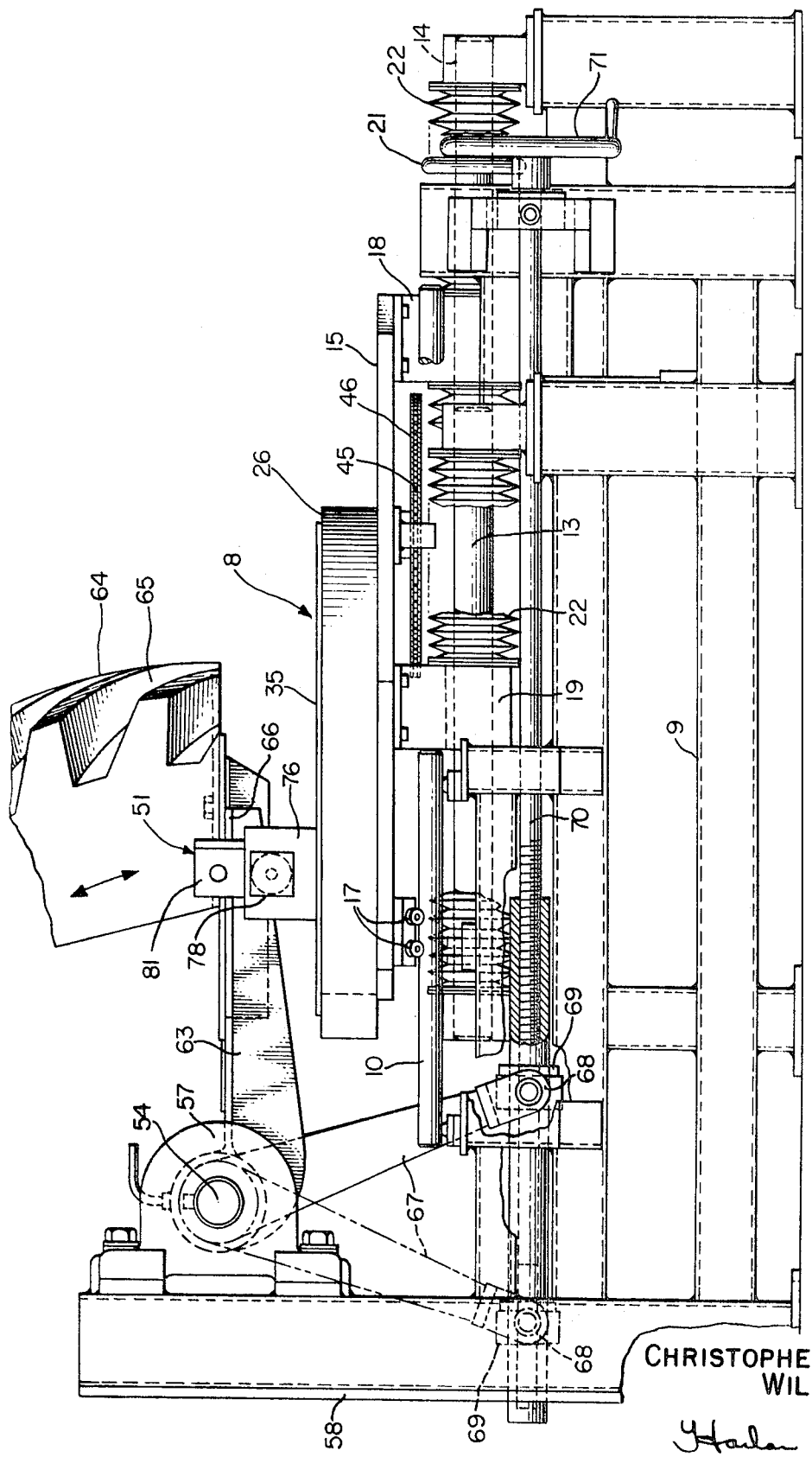
FIG. 4 is a left side view of the machine.

Referring, generally, to the drawing and, more particularly, to FIGS. 1–4, there is shown a machine, generally indicated at 8, for duplicating a predetermined tread design in a molded blank tread of a tire, especially large tractor or earthmoving pneumatic tires. The tread-duplicating machine 8 comprises an upstanding machine base or frame 9 on which a set of guide rails 10, 11, and 12, and a pair of guide rods 13 and 14 are all mounted in parallel relation.

A platform 15 is mounted on pairs of angularly disposed rollers 16 and 17, which rollingly engage the guide rails 10–12. A pair of brackets 18 and 19 (FIG. 4) extend from the platform 15 for coupling and sliding engagement along each of the guide rods 13 and 14 to stabilize the platform 15.

A drive screw 20 is mounted on the machine base 9 in parallel relation to the guide rails 10–12, and coupled to the platform 15. A hand-operated crank or wheel 21 is secured to the drivescrew 20 and used to operate or rotate the drivescrew 20 to reciprocate the platform 15 along the guide rails 10–12 and guide rods 13 and 14. A number of expansible bellows 22 are provided for protecting and keeping debris from falling on the guide rods 13 and 14 and hampering movement of the platform 15.

Figure 5:
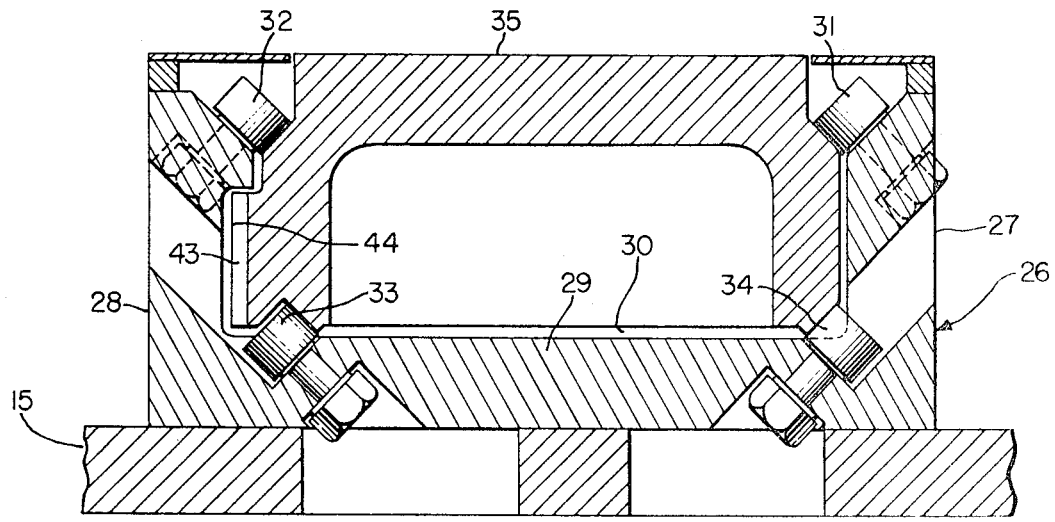
FIG. 5 is a section of the machine viewed from the line 5—5 of FIG. 1.

A pair of arcuate, preferably circular, trackways 25 and 26 are carried by the platform 15 in spaced side-by-side relation. Each of the trackways 25 and 26 (FIG. 5) are U-shaped having a pair of upstanding curved parallel sides 27 and 28, which are integrally formed with a base 29 secured to the platform 15. An arcuate recess 30 is formed between the upstanding sides 27 and 28 and base portion 29 of the trackways 25 and 26. A series of rectangularly spaced rollers 31, 32, 33, and 34 extend into the recess 30 in spaced relation along the trackways 25 and 26.

An inverted U-shaped arcuate mover 35 is movable along each trackway 25 and 26 in guided, rolling engagement between the rollers 31–34. Similar expansible bellows 36 (FIG. 1) are provided for preventing debris from falling into the recess 13 and hampering movement of the movers 35 along their respective trackways.

Figure 6:
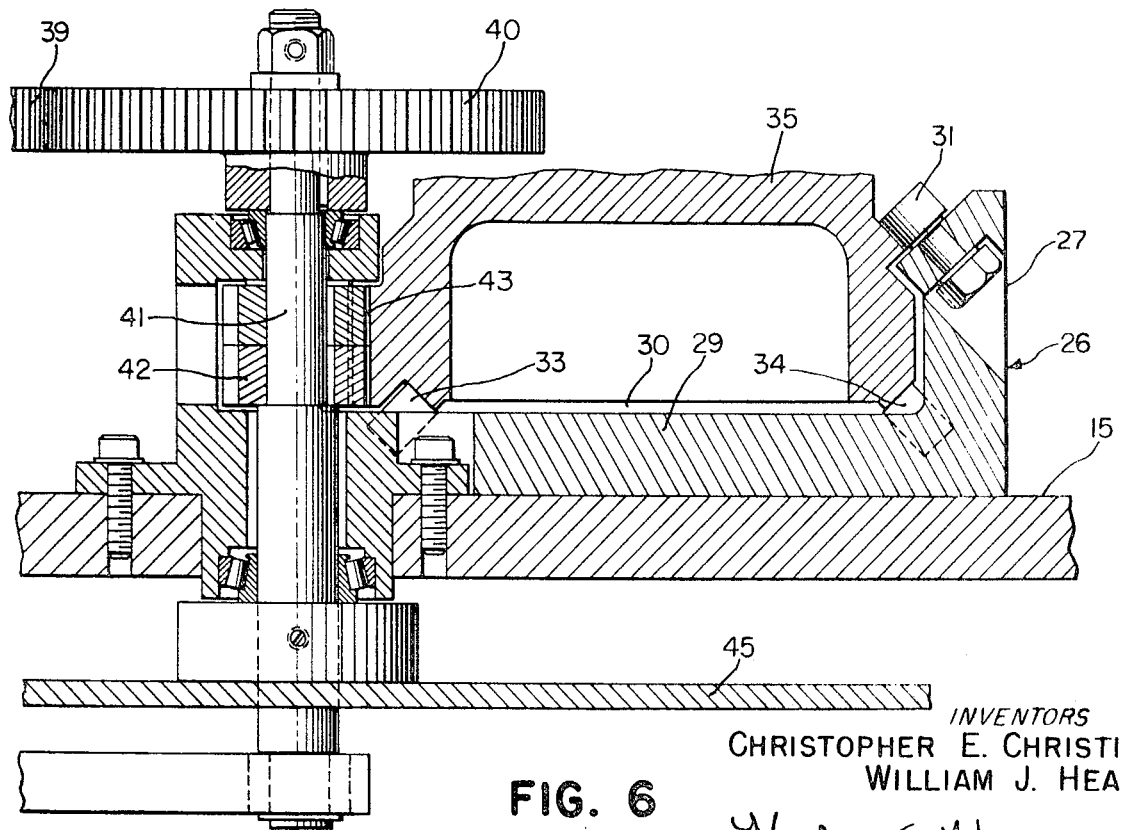
FIG. 6 is a section of the machine viewed from the line 6—6 of FIG. 1.

A manually rotated crank or wheel 38 is used for operating or moving the movers 35 in unitary corresponding relation along their respective trackways 25 and 26. A gear 39 (FIGS. 1 and 6), coupled to the handcrank 38, is in meshing driving relation with a conventionally designed spur gear 40 which, in turn, is keyed for unitary rotational movement with drive shaft 41. A smaller pinion 42 is keyed to the drive shaft 41 in spaced relation below the Boston gear 40. The pinion 42 is in meshing driving relation with gear teeth, e.g., tooth 43 (FIG. 5), disposed along the outer periphery 44 of the mover 35 in the adjacent trackway 26.

A sprocket wheel 45 is keyed to the drive shaft 41 and coupled by a chain belt 46 to a similar sprocket wheel 47 associated with the other mover 35 and trackway 25. The sprocket wheel 47 is similarly keyed to a drive shaft 48 for operating or rotating a pinion 49, which is in meshing driving engagement with gear teeth disposed along the outer periphery of the other mover 35 in the trackway 25. Thus, the movers 35 are correspondingly moved in unison along their respective trackways 25 and 26.

A cutting assembly 50 and sensor assembly 51 are mounted on the movers 35 in the trackways 25 and 26, respectively. These two assemblies will be described in greater detail after the following cooperating mechanisms have been explained.

A support bar 54 is journaled for rotation in a set of pillow blocks 55, 56, and 57, which are secured in aligned, spaced relation to an upstanding frame portion 58 of the machine base 9. The support bar 54 is disposed above the platform 15 and rotates about an axis which is parallel to the plane of the platform 15 and transversely disposed to the axes of the guide rails 10–12 and guide rods 13 and 14.

A conventionally designed indexing plate or ring 59 is mounted on the end 60 of the support bar 54 protruding or extending beyond the pillow block 55 adjacent the trackway 25. A tractor tire 61 with a molded blank tread 62, for example, is placed on a conventional wheel rim and inflated to a normal operating pressure. The tractor tire 61 is then mounted on the indexing plate 59 for rotation in a plane normal to the longitudinal axis of the support bar 54. The tractor tire 61, when mounted, extends towards the adjacent arcuate trackway 25. The carcass of the tire 61 in the area of the tread, assumes a generally circular configuration when inflated, having a simple radius R and center point CP. The handcrank 21 is used to move the platform 15 and trackways 25 and 26 towards the support bar 54, until the center point of the arcuate trackway 25 coincides with the center point CP of the tractor tire 61.

A support arm 63 (FIG. 1) is keyed to the support bar 54 intermediate the pillow blocks 56 and 57 and extends laterally towards the adjacent trackway 26. A pattern 64 with a predetermined tread design 65, is mounted on the free end 66 of the support arm 63. The pattern 64 is an arcuate segment which is cast or molded from any suitable material, e.g., plastic or plaster. The support arm 63 and pattern 64 can be integrally cast and mounted on the support bar 54.

A lever arm 67 (FIG. 4) is keyed to, and extends from the support bar 54 in a direction towards the platform 15. The free end 68 of the lever arm 67 is slidably mounted for limited vertical movement on a coupler 69 which threadably engages a drive rod 70 mounted on the machine base 9 in parallel relation to the guide rails 10–12. A handcrank 71 is provided for rotating the drive rod 70 to move the coupler 69 and consequently rotate the lever 67 which, in turn, rotates the tractor tire 61 and pattern 64 in unison through a corresponding arc which, at most, is equivalent, in degrees, to the pitch of the tread, i.e., the frequency which the tread design repeats itself around the circumference or tread of the tire. For example, if the tread design is repeated 10 times, the pitch would be 10 and the corresponding arc would be one-tenth of 360° or 36°. The lever arm 67 is designed to rotate through a maximum arc of about 40°, which accommodates most of the tractor tires presently being built.

CUTTING AND SENSOR ASSEMBLIES

The cutting and sensor assemblies 50 and 51 (FIG. 2) each comprise a guide 76, which is secured to the movers 35 in transverse radial relation to the circular centerline of the arcuate trackways 25 and 26. A carriage 77 is slidably mounted on each guide 76 for movement towards and away from the tractor tire 61 and tread pattern 64. A hydraulic cylinder 78 is coupled between each guide 76 and carriage 77 for reciprocating the carriage 77 along the guide 76.

An air or electric motor 79 is mounted on the movable carriage 77 of the cutting assembly 50. A cutter or cutting head 80 extends from the air motor 79 and rotates about an axis parallel to the shaft of the air motor 79. The cutter 80 is an end mill type cutter with two lips or cutting edges for cutting laterally and axially like a drill or auger in cutting rubber from the blank tread 62 of the tractor tire 61.

A conventionally designed mechanical servo-valve 81 is mounted on the carriage 77 of the sensor assembly 51. A sensor 82 is associated with the servo-valve 81 and biased by a coil spring (not shown) outwardly from the valve 81 for riding or gliding engagement over the tread design 65 formed in the pattern 64. The tracing extremity 83 of the sensor 82 and the cutter 80 are correspondingly configured to make the cutting more exact. The hydraulic cylinder 78 is designed to retract the carriage 77 and sensor 82, when a force exceeding a predetermined force acts against the sensor 82 in any direction (see dotted positions in FIG. 1), including an axial direction. The cutting and sensor assemblies 50 and 51 are in electrical communication such that the cutter 80 moves in corresponding relation to movement of the sensor 82 as it traces or moves along the recesses and ridges of the predetermined tread design 65 of the pattern 64.

The position of the piston within the hydraulic cylinder 78 of the sensing assembly 51, is sensed or monitored by a conventionally designed potentiometer 84 (FIG. 7) associated with the hydraulic cylinder 78. An electrical input signal from the potentiometer 84 is sent to a conventionally designed servocontrol unit 85. A second potentiometer 86, associated with the hydraulic cylinder 78 of the cutting assembly 50, also transmits an input signal to the servocontrol unit 85, which monitors and compares both input signals. The input signal from the potentiometer 86 will be in lagging relation to the input signal from potentiometer 84, if there is any difference between the signals.

The servocontrol unit 85 is designed to transmit an output signal in corresponding relation to the difference between the input signals. The output signal is received by a mechanical servo-valve 87 associated with the hydraulic cylinder 78 of the cutting assembly 50. The output signal acts upon the servo-valve 87 to adjust the position of the cutter 80 so that it corresponds to the position of the sensor 82. This electrical device is especially useful for retracting the cutter 80 immediately to keep it from gouging or making an erroneous cut in the blank tread 82 of the tractor tire 61, when the carriage 77 of the sensor assembly 51 retracts in response to a predetermined force on the sensor 82.

In operation, the tractor tire 61 is placed on a rim, inflated to a normal operating pressure and mounted on the indexing plate 59. The plastic tire pattern 64 is mounted for unitary rotational movement with the tractor tire 61. The platform 15 is then adjusted or moved such that the center point of the arcuate trackway 25 coincides with the center point CP of the radius R of the tractor tire carcass adjacent the tread. The cutting and sensor assemblies 50 and 51 are in the position shown in FIG. 1 and are moved laterally across the tire, or radially relative to a plane passing through the midcircumferential centerline of the tractor tread, by rotating the crank 38. A second lateral pass is made after the crank 71 is rotated to simultaneously arcuately reposition the tractor tire 61 and pattern 64. It has been found desirable to cut only one-half of the tire at a time, after which the tire and pattern 64 are reversed to complete cutting the tread. The tread design is cut circumferentially around one-half of the blank tread 62 of the tractor tire 61, before the pattern 64 and tire 61 are changed.

Thus there has been described a new and novel machine for duplicating a tread pattern in a molded blank tread of a tire. The machine is primarily designed for cutting heavier treads used in tires for tractors or other types of off-the-road equipment. It is conceivable, however, that using smaller sensors and cutters, the invention could be made applicable for cutting smaller tread grooves or recesses in passenger and smaller truck tires.

While certain representative embodiments and details have been shown for the purpose of illustrating the invention, it will be apparent to those skilled in the art that various changes and modifications may be made therein without departing from the spirit or scope of the invention.

What is claimed is:
1. A machine for cutting a tread design in a tire, comprising:
   a. means for mounting a pattern with a preformed tread design, for rotation through a predetermined arc;
   b. means for mounting a tire with a blank tread, for corresponding, unitary rotation with the pattern;
   c. a sensor for contact, gliding relation over the tread design of the pattern;
   d. a cutter for engaging and cutting a tread design in the blank tread; and
   e. means for moving the cutter in cutting relation with the blank tread in corresponding relation to contacting movement of the sensor over the tread design of the pattern.
2. The machine of claim 1, which includes:
   f. a pair of arcuate trackways along which the sensor and cutter move; and
   g. means for mounting the trackways for unitary movement towards and away from a pattern and tire mounted on the machine.
3. The machine of claim 2, wherein the pattern and tire are mounted for rotation in parallel planes.
4. The machine of claim 2, which includes:
   h. means for moving the sensor and cutter in unison along the trackways to laterally position the sensor and cutter relative to a plane passing through the midcircumferential centerline of the tread design of the pattern and blank tread of the tire.
5. The machine of claim 1, which includes:
   i. means for biasing the sensor against the tread design of the pattern.
6. The machine of claim 5, which includes:
   j. means for retracting the sensor from the pattern when a force exerted against the sensor exceeds a predetermined force for which the sensor is set to retract.
7. The machine of claim 1, which includes:
   k. a mechanism for sensing corresponding movement of the cutter relative to the sensor; and
   m. means for adjusting movement of the cutter to bring said movement into corresponding relation with movement of the sensor, when movement of the cutter lags behind corresponding movement of the sensor.

8. The machine of claim 1, wherein the center point of the arcuate trackway of the cutter is generally coincidental with the center point of the radius of the tire carcass before the machine is operated.

9. A machine for cutting a tread design in a tire, comprising:
   a. a machine base;
   b. a pair of arcuate trackways horizontally disposed in side-by-side spaced relation on the machine base;
   c. means for mounting a pattern with a preformed tread design, for rotation in a vertical plane and through a predetermined arc;
   d. means for mounting a tire with a blank tread, for rotation in unison with the pattern and in a plane parallel to the plane of rotation of the pattern;
   e. means for moving the trackways in unison to positions where they partially surround the pattern and tire;
   f. a sensor for contact, gliding relation over the tread design of the pattern;
   g. a cutter for engaging and cutting a tread design in the blank tread;
   h. means for mounting the sensor for movement along the trackway adjacent the pattern;
   i. means for mounting the cutter for movement along the trackway adjacent the tire;
   j. means for coupling the sensor and cutter together for unitary movement along the trackways;
   k. means for biasing the sensor against the tread design of the pattern;
   m. means for retracting the sensor from the pattern when a force exerted against the sensor exceeds a predetermined force for which the sensor is set to retract; and
   n. means for moving the cutter in cutting relation with the blank tread of the tire in corresponding relation to movement of the sensor in contacting relation over the tread design of the pattern.

10. The machine of claim 9, which includes:
    o. a mechanism for sensing corresponding movement of the cutter relative to the sensor; and
    p. means for adjusting movement of the cutter to bring said movement into corresponding relation with corresponding previous movement of the sensor, if movement of the cutter is lagging behind movement of the sensor.

11. The machine of claim 10, wherein the center point of the arcuate trackway of the cutter is generally coincidental with the center point of the radius of the tire carcass adjacent the blank tread before the machine is operated.

12. The machine of claim 11, wherein the sensor and cutter extend in a transverse radial direction relative to the circular centerline of their respective trackways.

13. A method of cutting a tread design in a tire, comprising the step of:
    a. moving a cutter in tread-cutting relation with a blank tire tread in corresponding relation to contacting movement of a sensor over a tread design disposed in a preformed pattern.

14. The method of claim 13, which includes:
    b. retracting the cutter from the tire tread in response to a predetermined force on the sensor.

* * * * *